Figure 1:
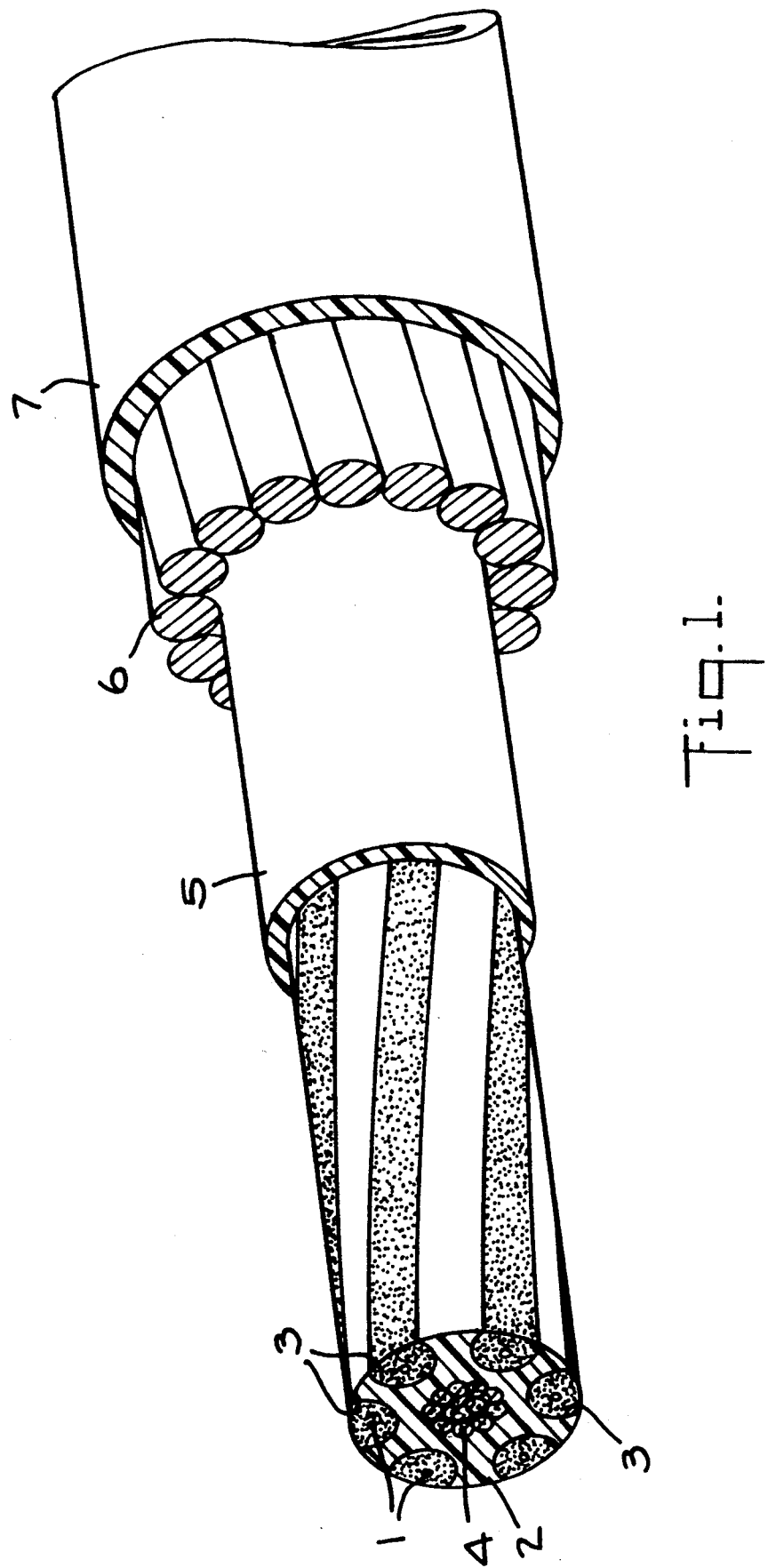

United States Patent [19]
Bosisio et al.

[11] Patent Number: 5,150,444
[45] Date of Patent: Sep. 22, 1992

[54] OPTICAL FIBER CABLES AND COMPONENTS THEREOF CONTAINING AN HOMOGENEOUS BARRIER COMPOSITION CAPABLE OF PROTECTING OPTICAL FIBERS FROM HYDROGEN, AND RELATIVE HOMOGENEOUS BARRIER COMPOSITION

[75] Inventors: Claudio Bosisio, Brembate Sotto; Antonio Campana, Milan, both of Italy

[73] Assignee: Pirelli Cavi S.p.A., Milan, Italy

[21] Appl. No.: 723,441

[22] Filed: Jun. 27, 1991

[30] Foreign Application Priority Data

Jul. 2, 1990 [IT] Italy ............................... 20833 A/90

[51] Int. Cl.$^5$ .............................................. G02B 6/44
[52] U.S. Cl. ................................................. 385/109
[58] Field of Search ............... 385/109, 107, 128, 145; 523/173

[56] References Cited

U.S. PATENT DOCUMENTS

| | | | |
|---|---|---|---|
| 4,755,020 | 7/1988 | Willis et al. | 385/109 |
| 4,755,577 | 7/1988 | Suzuki | 385/128 |
| 4,787,707 | 11/1988 | Kitayama et al. | 385/128 |

*Primary Examiner*—John D. Lee
*Assistant Examiner*—Robert E. Wise
*Attorney, Agent, or Firm*—Brooks Haidt Haffner & Delahunty

[57] ABSTRACT

An optical fibers cable and the relative components comprise a barrier mixture, to protect the optical fibers, comprising (a) at least a silicon unsaturated organic compound having more than 0.2 mmoles of unsaturated groups per 100 g of said compound, (b) at least a catalyst selected from the group comprising inorganic and organic complexes of transition metals and organic salts of transition metals; said barrier mixture is a further object of the invention and consists of an homogeneous phase.

19 Claims, 2 Drawing Sheets

OPTICAL FIBER CABLES AND COMPONENTS THEREOF CONTAINING AN HOMOGENEOUS BARRIER COMPOSITION CAPABLE OF PROTECTING OPTICAL FIBERS FROM HYDROGEN, AND RELATIVE HOMOGENEOUS BARRIER COMPOSITION

This invention relates to optical fiber cables and components thereof containing a homogeneous barrier composition or mixture suitable to protect optical fibers from hydrogen; it also relates to a method for preparing said composition or mixture and said homogeneous barrier composition or mixture per se.

It is known that hydrogen is detrimental to optical fibers of optical cables and impairs their efficiency. Some compositions able to capture hydrogen before it contacts the optical fibers of optical cables have been therefore proposed.

U.S. Pat. No. 4,688,889 teaches to capture hydrogen by means of an hydrogen fixing filler for cables and components thereof containing such filler which comprises:

(a) at least an unsaturated organic silicone having more than 0.2 mmoles of unsaturated groups per 100 g of said compound and having the following general formula:

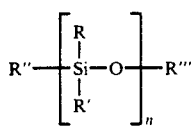

wherein:
R and R' are selected from saturated or unsaturated aliphatic radicals and aromatic radicals,
R" and R'" are aliphatic unsaturated radicals, and
n is an integer; and (b) at least a catalyst selected from the group consisting of transition metals, inorganic and organometallic salts of transition metals and organometallic acids of transition metals.

As it is also apparent from the pertinent examples, the catalysts according to said patent are typically in the form of powders, either free or supported onto suitable solid inert materials.

In turn, UK-A-2,172,410 teaches to capture hydrogen with a hydrogen trapping powder which is free or, preferably, supported on a flexible film of paper or polymeric material. As an example of a powder suitable for capturing hydrogen, the said patent mentions palladium on carbon.

Furthermore, it is also known that microbendings substantially reduce optical fibres efficiency (G. Grasso et al. "Microbending effects in single mode optical cables"—International Wire & Cable Symposium Proceedings 1988).

Now, it has been found that the particles of the powders forming the materials of U.S. Pat. No. 4,688,889 and UK-A-2172410 cause microbendings when they are contacted with optical fibres. Said materials are thus less effective than they could be if they are directly contacted with the optical fibres; moreover, also the manufacturing of optical cables is more difficult than it could be if a composition were available, directly applicable in contact with the optical fibres to exert an effective barrier function against hydrogen without causing the drawbacks (microbendings) of known compositions. On the other hand, it does not appear that any composition was disclosed consisting of a homogeneous phase, comprising a silicon unsaturated organic compound of formula I and a hydrogenation catalyst, having high hydrogen adsorbing power.

Therefore, this invention aims to provide a composition having all the above cited features for use in the production of optical cables and components thereof.

This object has been surprisingly achieved by dissolving a catalyst selected from the group comprising inorganic and organic complexes of transition metals and organic salts of transition metals in a volatile organic solvent, mixing the thus obtained solution with a silicon unsaturated organic compound, and removing the solvent from the thus prepared mixture.

In the present description and in the appended claims, the expression "organic volatile solvent" means an organic fluid having the following properties:
a vapour pressure higher than 200 Pa at 20° C.;
1 part by volume dissolves at least 0.001 parts by weight of a catalyst of the present invention; and
it is mixable with the unsaturated silicon organic compounds of the formula I.

The barrier compositions of this invention are substantially different from those disclosed by U.S. Pat. No. 4,688,889 because they do not contain metal or crystalline particles at the microscopic and X-ray diffraction inspection.

An object of the present invention is to provide optical fiber cables and components thereof containing this particular homogeneous barrier composition which is, per se, also a further object of this invention as hereinafter defined.

A further object of this invention is therefore a barrier composition capable of chemically adsorbing hydrogen, thus protecting optical fibers of optical cables from said gas, comprising:

(a) at least a silicon unsaturated organic compound having more than 0.2 mmoles of unsaturated groups per 100 g of said compound and having the following general formula:

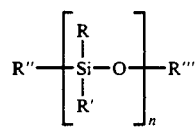

wherein:
R and R', which may be the same or different, are alkyl, alkenyl or aryl
R" and R'", which may be the same or different, are alkenyl, and
n is an integer;

(b) at least a catalyst selected from the group comprising organic and inorganic complexes of transition metals and organic salts of transition metals, characterized in that it consists of an homogeneous phase which does not contain any metal or crystalline particle at the microscopic and X-ray diffractometric inspection.

The preferred silicon unsaturated organic compounds of this invention have from 2 to 100 mmoles of unsaturated groups per 100 g of compound; most preferably, they have from 5 to 80 mmoles of unsaturated groups per 100 g.

Typically, n is an integer from 10 to 2000.

Preferred meanings of R and R' are 1-4C alkyl, 2-10C alkenyl and phenyl.

In turn, R" and R'" are preferably the same or different 2-10C alkenyl.

Typical examples of catalysts are palladium acetate; palladium, platinum or rhodium acetylacetonate; dimeric allylpalladiumchloride (PdCl(C3H5))2; S tetrakis(triphenyl S phosphine)-palladium; bis-(chlorodicarbonyl)-rhodium S and bis(dibenzylindeneacetone)-palladium.

The amount of catalyst (parts of transition metal in the homogeneous barrier composition of this invention) is preferably of from 5 to 2000 ppm and, most preferably, 100 to 200 ppm.

The barrier composition according to this invention may also contain ketone; lower aliphatic halogenated hydrocarbons such as, for example, chloroform, methylene chloride and carbon tetrachloride; aromatic hydrocarbons such as, for example, benzene, toluene and xylene.

The person skilled in the art will easily estimate with good approximation the amount of hydrogen gas that may penetrate from outside into an optical fibre cable or that may generate inside the cable (release of hydrogen gas adsorbed by the materials of the cable during the manufacturing processes or formed by decomposition of some of said materials) depending on to the cable structure, the materials of which it is formed, and the operating conditions. He is therefore in a position to estimate the minimum amount of homogeneous barrier mixture to be applied case by case.

Examples of optical cables and components thereof, which may be advantageously manufactured with the barrier composition of this invention to protect the optical fibres from hydrogen, are disclosed in the above cited documents U.S. Pat. No. 4,688,889 and UK-A-2172410, and also in the following: EP-A-280279, FR-A-2200535, UK-A-1598540, UK-A-2021282, UK-A-2099173, UK-A-2170921, UK-A-2174822, U.S. Pat. Nos. 4,143,942, 4,153,332, 4,199,224; 4,491,386; 4,676,950; 4,491,387 and 4,690,498.

Figure 2:
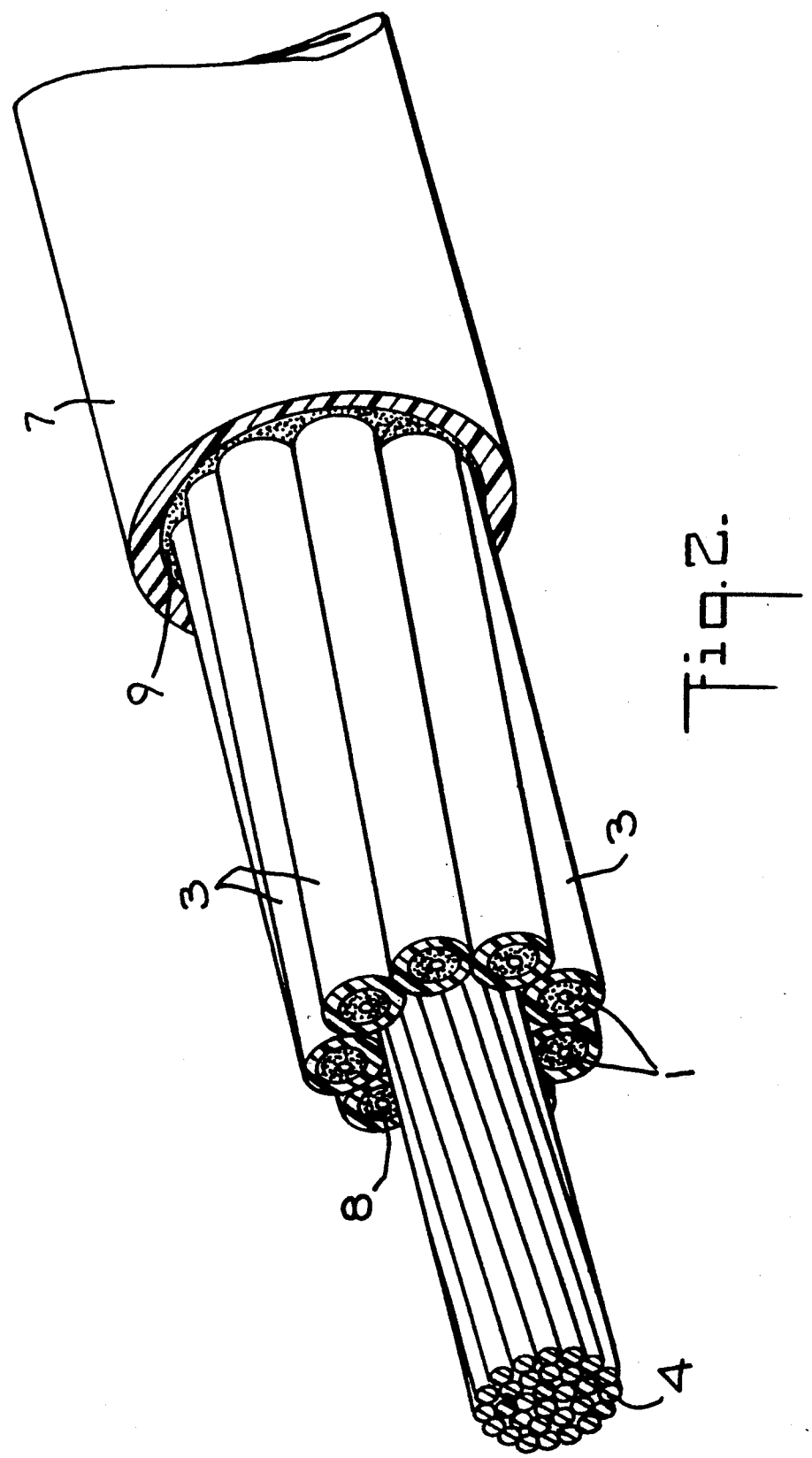

The use of the barrier composition of the invention in connection with optical fiber cables of the type shown in U.S. Pat. Nos. 4,688,889 and 4,725,123 is illustrated in the accompanying drawings in which:

FIG. 1 is a perspective view of an optical fiber cable of the type shown and described in U.S. Pat. No. 4,688,889 and including the barrier composition of the invention; and FIG. 2 is a perspective view of an optical fiber able of the type shown and described in U.S. Pat. No. 4,725,123 and including the barrier composition of the invention.

The cables shown in FIGS. 1 and 2 are merely an example of optical fiber cables with which the barrier mixture of the invention may be used since it will be apparent to those skilled in the art that the barrier mixture may be incorporated in optical fiber cables of different types.

As shown in FIGS. 1 and 2, the optical fiber cables comprise suitable seats 3 for housing optical fibers 1. The said seats 3 may be helical grooves (FIG. 1) made in a core 2 made of plastic material or small plastic tubes (FIG. 2). The seats 3 are associated with sheaths 5 and 7 preferably made of plastic material as well as with elements 4 and 6 resistant to traction.

As known to the person skilled in the art, the elements resistant to the reaction are axially and/or peripherally located depending on the expected use of the cable and the manufacturing technology.

The element 4 in FIG. 1 is preferably made of glass-resin while the elements 4 in FIG. 2 and the elements 6 in FIG. 1 are preferably made of metal ropes.

In FIG. 1, the grooves 3 housing the optical fibers 1 are filled with the barrier mixture of the invention.

In FIG. 2, the barrier mixture fills the small plastic tubes 3 housing the optical fibers and/or the inner recesses 8 and/or the outer recesses 9 surrounding the small plastic tubes 3. Thus, the small plastic tubes 3 in FIG. 2 can be filled and/or surrounded by the barrier mixture of the invention.

The following example will illustrate the present invention without, however, limiting it in any way.

EXAMPLE 1

| | |
|---|---|
| vinyl terminated polysiloxane oil having a content of vinyl groups of 7.8 mmoles/100 g | 96.00 g |
| palladium acetate containing 47% of Pd (corresponding to 141 ppm of Pd) | 0.03 g |
| colloidal silica (average particle diameter = 12 nm) | 3.97 g |

6 g of a 0.5% solution of palladium acetate in acetone were added under stirring to the vinyl terminated polydimethyl siloxane oil and the solvent was removed under vacuum at room temperature in 4 hours while stirring. The thus obtained product was thickened by addition of colloidal silica powder which was dispersed by means of a baffle disperser. Finally, the mixture was homogeneized by passing through a three drum refiner.

EXAMPLE 2

| | |
|---|---|
| saturated polydimethylsiloxane oil | 86.00 g |
| polydimethylsiloxane oil having 23 mmoles/100 g of vinyl groups in terminal and branched chains | 10.00 g |
| palladium acetylacetonate containing 35% of palladium (corresponding to 280 ppm of Pd) | 0.08 g |
| colloidal silica powder (particle average diameter = 12 nm) | 3.92 g |

16 g of a 0.5% solution of palladium acetylacetonate in acetone were added under stirring to the mixture of the polydimethylsiloxane oils and the solvent was removed under vacuum at room temperature for 8 hours while stirring. The thus obtained product was then thickened by addition of colloidal silica powder which was dispersed by means of a baffle disperser. Finally, the mixture was homogeneized by passing through a three drum refiner.

TESTS

The capability of adsorbing hydrogen by the homogeneous barrier mixture of this invention was tested with a method based on measurements of the pressure drop occurring in a sealed container containing the material under examination in hydrogen atmosphere.

The device was an apparatus for automatic pressure measurement within the range of from 1000 mbar to 1 mbar. The apparatus was made by assembling a fixed volume chamber having two valves (one being a pin valve to control the hydrogen feeding, and the other one being a conventional valve to provide connection with a vacuum pump) to a commercial pressure transducer type E 8510 connected with a commercially available digital lector type EMV251, both manufactured by Edwards High Vacuum SpA.

Inside the apparatus is housed a glass container. The control unity provided with digital reading of the pressure has a resolution of 1 mbar and the pressure reading is independent from the gas composition and the atmospheric pressure.

The tests were performed at a constant temperature of 23° C.

The glass container was weighted with a precision of 0.01 g (weight A), and then the bottom and wall of the container were uniformly spreaded with about 10 g of the homogeneous barrier mixture under examination. When the addition of the composition was over, the glass container was weighted a second time (weight B).

The glass container containing the homogeneous barrier mixture was housed in the apparatus and vacuum was applied for about 1-2 hrs. After having maintained the system under static vacuum for at least 12 hours, the container was connected to a hydrogen bottle until the digital pressure indicator showed the required pressure (usually about 500 or 1000 mbar).

The hydrogen bottle valve was closed and both the time and hydrogen pressure were recorded.

After 24 hours the residual hydrogen pressure was measured.

The hydrogen adsorbing capability in normal cm3/g was calculated with the following formula:

$$\frac{(P - Pr) \times V \times 273}{1013 \times (273 + C) \times (B - A)}$$

where:
P is the initial hydrogen pressure,
Pr is the residual hydrogen pressure after 24 hrs.
C is the temperature, in centigrade degrees, during the test
V is the free volume of the apparatus after spreading about 10 g of material,
B is the weight of the glass container with the material
A is the weight of the empty glass container.

For each sample of barrier mixture the above cited test was performed twice and the means of the obtained values was calculated.

In the case of the homogeneous barrier mixture of the examples, the operational conditions of the tests and the relevant results were:

| composition of Example 1 | |
|---|---|
| chamber volume = | 104.90 cm3 |
| free volume = | 94.90 cm3 |
| initial hydrogen quantity = 46.8 normal cm3 = (corresponding to 500 mbar) | 4.18 × 10−3 g |
| final hydrogen quantity = 29.9 normal cm3 = (corresponding to 319 mbar) | 2.67 × 10−3 g |
| adsorbed hydrogen quantity = 16.9 normal cm3 = | 1.51 × 10−3 g |
| theoretical adsorption = | 1.50 × 10−3 g. |
| composition of Example 2 | |
| chamber volume = | 102.60 cm3 |
| free volume = | 92.60 cm3 |
| initial hydrogen quantity = 91.4 normal cm3 = (corresponding to 1000 mbar) | 8.16 × 10−3 g |
| final hydrogen quantity = 42.8 normal cm3 = (corresponding to 468 mbar) | 3.82 × 10−g |
| adsorbed hydrogen quantity = 48.6 normal cm3 = | 4.34 × 10−3 g |
| theoretical adsorption = | 4.40 × 10−3 g. |

We claim:

1. An optical fibers cable comprising at least an optical fiber housed in a suitable seat, said optical fiber being protected against the damaging action of hydrogen by a barrier composition which is capable of absorbing hydrogen chemically and comprises (a) at least a silicon unsaturated organic compound having more than 0.2 mmoles of unsaturated groups per 100 g of said compound and having the following general formula:

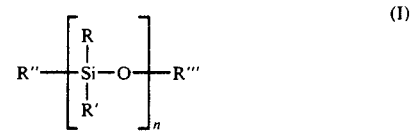

wherein:
R and R', which may be the same or different, are alkyl, alkenyl or aryl
R" and R'", which may be the same or different, are alkenyl, and
n is an integer;

(b) at least a catalyst selected from the group comprising inorganic and organic complexes of transition metals and organic salts of transition metals characterized in that said barrier composition consists of an homogeneous phase which does not contain any metal or crystalline particle at the microscopic and X-ray diffractometric inspection.

2. A component for optical fiber cables, consisting of a suitable seat wherein at least an optical fiber is loosely housed, said optical fiber being protected against the damaging action of hydrogen by a barrier composition which is capable of absorbing hydrogen chemically and comprises (a) at least a silicon unsaturated organic compound having more than 0.2 mmoles of unsaturated groups per 100 g of said compound and having the following general formula:

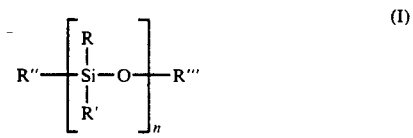

wherein:
R and R', which may be the same or different, are alkyl, alkenyl or aryl
R" and R'", which may be the same or different, are alkenyl, and
n is an integer;

(b) at least a catalyst selected from the group comprising inorganic and organic complexes of transition metals and organic salts of transition metals characterized in that said composition consists of a homogeneous phase which does not contain any metal or crystalline particle at the microscopic and X-ray diffractometric inspection.

3. A barrier composition capable of chemically adsorbing hydrogen, thus protecting optical fibers of optical cables from said gas, comprising:

(a) at least a silicon unsaturated organic compound having more than 0.2 mmoles of unsaturated groups per 100 g of said compound and having the following general formula:

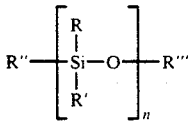

wherein:
R and R', which may be the same or different, are alkyl, alkenyl or aryl
R" and R"', which may be the same or different, are alkenyl, and
n is an integer; and (b) at least a catalyst selected from the group comprising inorganic and organic complexes of transition metals and organic salts of transition metals characterized in that it consists of an homogeneous phase which does not contain any metal or crystalline particle at the microscopic and X-ray diffractometric inspection.

4. A method for preparing a homogeneous barrier composition capable of chemically adsorbing hydrogen, thus protecting the optical fibers of the optical cables from said gas, characterized in that:

at least one catalyst selected from the group comprising inorganic and organic complexes of transition metals and organic salts of transition metals is dissolved in an organic volatile solvent, the thus obtained solution is admixed with an organic unsaturated silicon compound which has the following general formula:

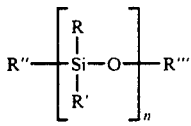

wherein:
R and R', which may be the same or different, are alkyl, alkenyl or aryl
R" and R"', which may be the same or different, are alkenyl, and
n is an integer; and has more than 0.2 mmoles of unsaturated groups per 100 g of said compound;
said solvent is removed from the thus prepared composition and, when desired,
a thickening agent is added.

5. A method according to claim 4, characterized in that the silicon unsaturated organic compound has from 2 to 100 mmoles of unsaturated groups per 100 g of compound.

6. A method according to claim 5, characterized in that the silicon unsaturated organic compound has from 5 to 80 mmoles of unsaturated groups per 100 g of compound.

7. A method according to any one of claims from 4 to 6, characterized in that n is an integer comprised from 10 to 2,000.

8. A method according to any one of claims from 4 to 6, characterized in that R and R', which may be the same or different, are a 1-4C alkyl, a 2-10C alkenyl or phenyl.

9. A method according to any one of claims from 4 to 6, characterized in that R" and R"', which may be the same or different, are a 2-10C alkenyl.

10. A method according to any one of claims from 4 to 6, characterized in that the catalyst is selected from the group comprising palladium acetate; palladium, platinum or rhodium acetylacetonate; dimeric allylpalladiumchloride (PdCl(C3H5))2; tetrakis(triphenylphosphine)-palladium; bis-(chlorodicarbonyl)-rhodium and bis(dibenzyl-indeneacetone)-palladium.

11. A method according to any one of claims from 4 to 6, characterized in that the amount of catalyst, in parts of transition metal in said composition, is of from 5 to 2,000 ppm.

12. A method according to claim 11, characterized in that the amount of catalyst is of from 1000 to 200 ppm.

13. A method according to any one of claims from 4 to 6, characterized in that the solvent is selected from the group comprising lower aliphatic ketones, lower aliphatic halogenated hydrocarbons and aromatic hydrocarbons.

14. A method according to claim 13, characterized in that the solvent is selected from the group comprising acetone, methyl ethyl ketone, chloroform, methylene chloride, carbon tetrachloride, benzene, toluene and xylene.

15. A method according to any one of claims from 4 to 6, characterized in that the solvent is removed by evaporation at a temperature of from 15° to 80° C.

16. A method according to any one of claims from 4 to 6, characterized in that the solvent is removed by evaporation at a pressure of from atmospheric pressure to $1.33 \times 10^{-4}$ bar.

17. A method according to any one of claims from 4 to 6, characterized in that the thickening agent is a colloidal silica having an average particle size of from 10 to 20 nm.

18. An optical fibers cable comprising at least an optical fiber housed in a suitable set, said optical fiber being protected against the damaging action of hydrogen by a homogeneous barrier composition prepared according to any one of claims from 4 to 6.

19. A component for optical fiber cables, consisting of a suitable seat wherein at least an optical fiber is loosely housed, said optical fiber being protected against the damaging action of hydrogen by a homogeneous barrier composition prepared according to any one of claims from 4 to 6.

* * * * *

UNITED STATES PATENT AND TRADEMARK OFFICE
CERTIFICATE OF CORRECTION

PATENT NO. : 5,150,444
DATED : September 22, 1992
INVENTOR(S) : Bosisio et al

It is certified that error appears in the above-identified patent and that said Letters Patent is hereby corrected as shown below:

Col. 1, line 63, change "are" to --were--;

Col. 3, lines 8, 9 and 10, cancel the "S";
      line 51, change "able" to --cable--;

Col. 5, line 42, change "means" to --mean--;
      line 60, change "3.82 x 10-g" to --3.82 x 10-3g--;

Col. 8, line 25, change "1000" to --100--.

Signed and Sealed this

Twenty-third Day of November, 1993

Attest:

BRUCE LEHMAN

Attesting Officer     Commissioner of Patents and Trademarks